(12) United States Patent
Coffman

(10) Patent No.: US 12,223,594 B2
(45) Date of Patent: Feb. 11, 2025

(54) THREE-DIMENSIONAL INSPECTION TWIN FOR REMOTE VISUAL INSPECTION OF A VEHICLE

(71) Applicant: The Boeing Company, Chicago, IL (US)

(72) Inventor: Mathew A. Coffman, Weldon Spring, MO (US)

(73) Assignee: The Boeing Company, Chicago, IL (US)

( * ) Notice: Subject to any disclaimer, the term of this patent is extended or adjusted under 35 U.S.C. 154(b) by 39 days.

(21) Appl. No.: 17/643,735

(22) Filed: Dec. 10, 2021

(65) Prior Publication Data

US 2023/0186563 A1 Jun. 15, 2023

(51) Int. Cl.
| | |
|---|---|
| *G06T 17/20* | (2006.01) |
| *G06T 7/194* | (2017.01) |
| *G06T 7/30* | (2017.01) |
| *G06T 15/04* | (2011.01) |

(52) U.S. Cl.
CPC ............. *G06T 17/20* (2013.01); *G06T 7/194* (2017.01); *G06T 7/30* (2017.01); *G06T 15/04* (2013.01); *G06T 2207/20092* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,982,207 B2 | 3/2015 | Jang | |
| 11,585,917 B1* | 2/2023 | Wu | ........................ G06V 20/20 |
| 2005/0140670 A1* | 6/2005 | Wu | ........................ G06T 15/205 |
| | | | 345/419 |

(Continued)

FOREIGN PATENT DOCUMENTS

| | | |
|---|---|---|
| CN | 112419429 A | 2/2021 |
| CN | 112505065 A | 3/2021 |

OTHER PUBLICATIONS

Rice, M. et al. "Automating the Visual Inspection of Aircraft", Feb. 28, 2018.

(Continued)

*Primary Examiner* — Anh-Tuan V Nguyen
(74) *Attorney, Agent, or Firm* — Joseph M. Butscher; The Small Patent Law Group, LLC

(57) ABSTRACT

A method is provided for generating a three-dimensional (3D) visually representative model of a vehicle. The method includes receiving images acquired from a number of viewpoints of different sections of the vehicle, and performing photogrammetry on the images to extract a profile of the vehicle. The method includes creating a wireframe mesh or point cloud from the profile, and generating the 3D model of the vehicle. The images are processed to determine areas on a surface of the vehicle in which a defect is detected, and markers are appended onto respective areas of the 3D model that correspond to the areas on the surface of the vehicle such that the defect is appended onto the 3D model. And the method includes generating a display of the 3D model of the vehicle including the markers that indicate the areas on the surface of the vehicle in which the defect is detected.

20 Claims, 9 Drawing Sheets

(56) References Cited

U.S. PATENT DOCUMENTS

| | | | | |
|---|---|---|---|---|
| 2006/0132291 | A1* | 6/2006 | Dourney | G06Q 99/00 348/148 |
| 2006/0155614 | A1* | 7/2006 | Woytowick | G06Q 30/00 705/26.62 |
| 2006/0232583 | A1* | 10/2006 | Petrov | G06V 10/10 345/419 |
| 2008/0307327 | A1* | 12/2008 | Newcomer | G06T 19/20 715/757 |
| 2009/0018859 | A1* | 1/2009 | Purifoy | G06Q 10/10 705/305 |
| 2009/0248323 | A1* | 10/2009 | Turner | G01N 29/30 702/39 |
| 2010/0204964 | A1* | 8/2010 | Pack | G06T 7/521 703/2 |
| 2013/0033595 | A1* | 2/2013 | Adelson | A61B 5/0077 362/296.01 |
| 2014/0088819 | A1* | 3/2014 | Easterly | G06Q 50/30 701/31.6 |
| 2014/0185911 | A1* | 7/2014 | Steffenson | G06T 7/75 382/141 |
| 2015/0382123 | A1* | 12/2015 | Jobani | H04R 1/1016 700/98 |
| 2016/0055665 | A1* | 2/2016 | Floyd | G09G 5/02 345/419 |
| 2016/0381323 | A1* | 12/2016 | Garcia, III | G06Q 30/0641 348/38 |
| 2017/0052070 | A1* | 2/2017 | Marsh | G06T 7/40 |
| 2017/0337726 | A1* | 11/2017 | Bui | G06T 7/97 |
| 2018/0170540 | A1* | 6/2018 | Claybrough | G05D 1/104 |
| 2018/0349518 | A1* | 12/2018 | Byers | G05B 19/41875 |
| 2018/0364033 | A1* | 12/2018 | Döring | G01B 11/245 |
| 2019/0066408 | A1* | 2/2019 | Vijayan | G06T 19/00 |
| 2019/0185186 | A1* | 6/2019 | Li | G06V 10/757 |
| 2020/0096328 | A1* | 3/2020 | Raab | G01B 11/2522 |
| 2021/0217158 | A1* | 7/2021 | Holzer | G06Q 10/20 |
| 2021/0241510 | A1* | 8/2021 | Kuribayashi | G06T 15/04 |
| 2021/0342997 | A1* | 11/2021 | Malreddy | G06T 7/70 |
| 2022/0189095 | A1* | 6/2022 | Hauswiesner | G06T 7/11 |
| 2022/0189124 | A1* | 6/2022 | Sanor | G06T 19/006 |
| 2022/0198769 | A1* | 6/2022 | Pamuru | G06T 7/55 |

OTHER PUBLICATIONS

Jovancevic, I. et al., "3D Point Cloud Analysis for Detection and Characterization of Defects on Airplane Exterior Surface", J Nondestruct Eval, 2017, vol. 36, No. 74, Springer Science and Business Media.

Perry, B.J. et al., "Streamlined bridge inspection system utilizing unmanned aerial vehicles (UAVs) and machine learning", 2020, vol. 164, Elsevier Ltd.

* cited by examiner

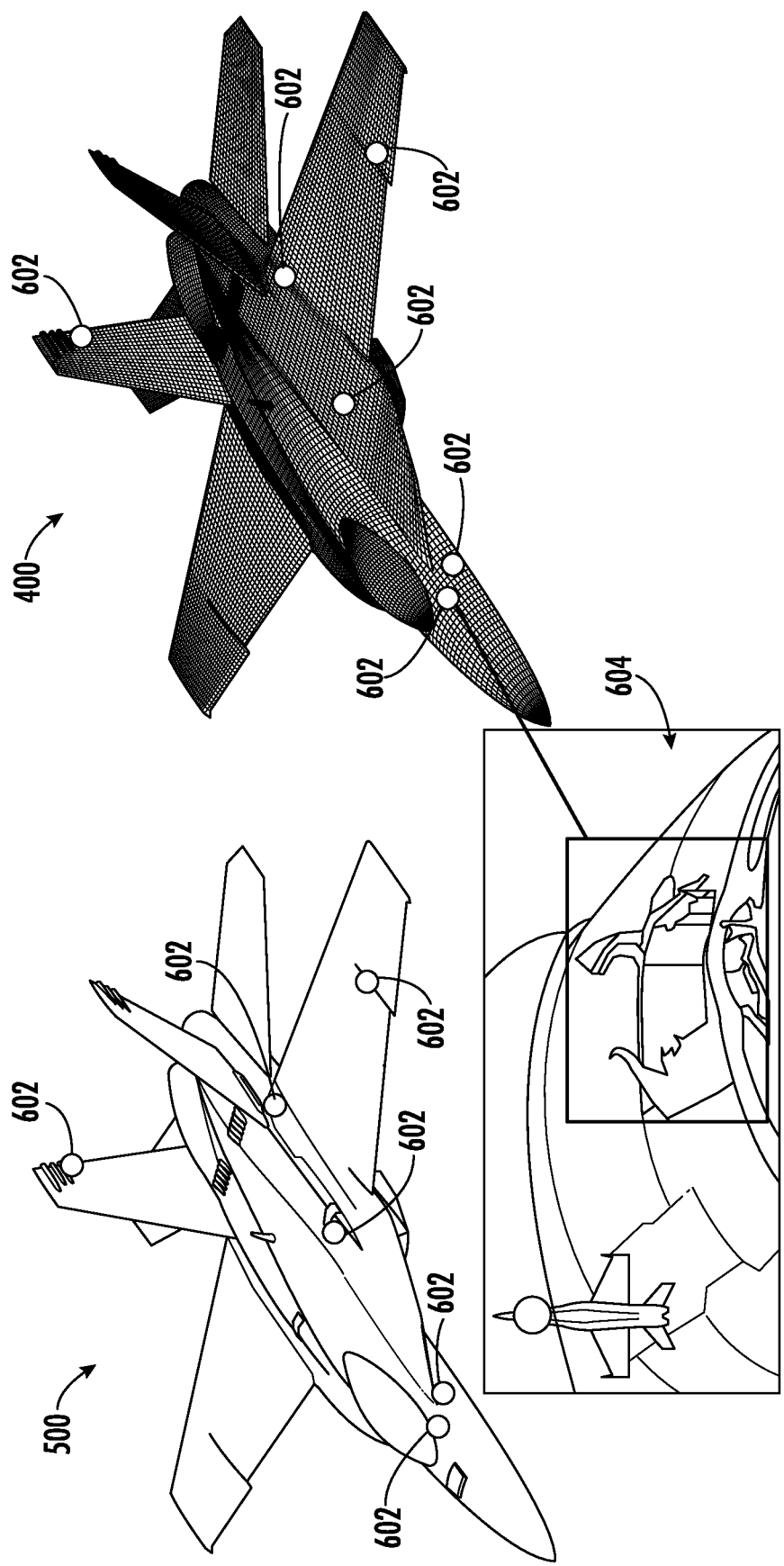

716 — PERFORM REGISTRATION OF THE 3D MODEL TO A 3D GEOMETRY MODEL OF THE VEHICLE AS AN ITERATION OF THE 3D GEOMETRY MODEL OF THE VEHICLE, THE ITERATION OF THE 3D GEOMETRY MODEL INCLUDING A DIGITAL RECORD INDICATING THE ONE OR MORE AREAS ON THE SURFACE OF THE VEHICLE IN WHICH THE DEFECT IS DETECTED AND ANY REPAIR OF THE DEFECT

718 — MERGE THE IMAGES AFTER THE VEHICLE IS SEPARATED FROM THE BACKGROUND

720 — CREATING THE WIREFRAME MESH OR THE POINT CLOUD FROM THE IMAGES AS MERGED

FIG. 7D

722 — CREATE A PHOTO-REALISTIC TEXTURE FROM A TWO-DIMENSIONAL (2D) OR 3D SCAN OF THE VEHICLE

724 — MAP THE PHOTO-REALISTIC TEXTURE TO THE WIREFRAME MESH, INCLUDING THE PHOTO-REALISTIC TEXTURE MAPPED ONTO 2D FACES OF THE 3D MODEL AS COLORIZED POINTS, VOXELS, OR MAPPED PIXELS

726 — DISPLAY THE PHOTO-REALISTIC TEXTURE ON THE 3D MODEL

FIG. 7E

THREE-DIMENSIONAL INSPECTION TWIN FOR REMOTE VISUAL INSPECTION OF A VEHICLE

TECHNOLOGICAL FIELD

The present disclosure relates generally to inspection of vehicles such as aircraft and, in particular, to three-dimensional (3D) inspection twin for remote visual inspection of a vehicle.

BACKGROUND

Nondestructive inspection (NDI) of a vehicle involves thoroughly examining the vehicle without harming or requiring its significant disassembly. Nondestructive inspection is typically preferred to avoid the schedule, labor and costs associated with removal of a part for inspection, as well as avoidance of the potential for damaging the vehicle. Nondestructive inspection is advantageous for many applications in which a thorough inspection of the exterior and/or interior of a structure is required. For example, non-destructive inspection is commonly used in the aircraft industry to inspect aircraft structures for any type of internal or external damage to or defects (flaws) in the structure. Inspection may be performed during manufacturing or after the completed structure has been put into service, including field testing, to validate the integrity and fitness of the structure.

A number of nondestructive testing techniques may involve remote inspection through live camera feed, recorded video or images; and when a defect is found, the video or images may be located on a three-dimensional (3D) model of the vehicle. This often requires registration of the video or images to a global coordinate system, or to geometry of the vehicle. Points or geometric shapes of the defect may be traced onto the 3D model. This process often does not work well with features that are ambiguous or otherwise difficult to map to a 3D model. And the process relies on a static 3D model, and does not account for changes that occur to a vehicle throughout its lifecycle, or by its environment. One example is that aircraft sections may droop when fueled versus not fueled.

It would therefore be desirable to have a system and method that takes into account at least some of the issues discussed above, as well as other possible issues.

BRIEF SUMMARY

Example implementations of the present disclosure are directed to inspection of vehicles such as aircraft and, in particular, to three-dimensional (3D) inspection twin for remote visual inspection of a vehicle. According to example implementations, enough images of the vehicle may be acquired to create a 3D model using photogrammetry, and high-resolution images and/or multispectral data may be mapped with directive lighting, to allow for detailed inspections remotely when sufficient resources or skills are locally unavailable. This 3D model may also serve as an inspection 3D digital twin used as a basis of comparison for other inspections.

Assembly of the images, 3D model and the like may also enable automated inspection systems, and multi-spectral automated inspection. Inspection may be executed by teams of trained personnel using the 3D digital twin, which may provide faster and more accurate records. Imaging devices (e.g., cameras) and setup used to acquire images of the vehicle may be capable of resolutions at or better than standard eye resolution. Display may include stepped resolution upon zooming into target details due to information storage size. And directional lighting may provide users with grazing contrast to detect defects with shadows.

The present disclosure thus includes, without limitation, the following example implementations.

Some example implementations provide an inspection system for generating a three-dimensional (3D) visually representative model of a vehicle, the system comprising: a plurality of imaging devices positioned within a hangar such that the imaging devices are configured to acquire images from a number of viewpoints of different sections of a vehicle within the hangar; and a computer configured to at least: receive the images from the plurality of imaging devices; perform photogrammetry on the images to extract a profile of the vehicle; create a wireframe mesh or point cloud from the profile, and generate a 3D model of the vehicle based on the wireframe mesh or the point cloud; perform image processing of the images to determine one or more areas on a surface of the vehicle in which a defect is detected; append one or more markers onto respective one or more areas of the 3D model that correspond to the one or more areas on the surface of the vehicle such that the defect is appended onto the 3D model; and generate a display of the 3D model of the vehicle including the one or more markers that indicate the one or more areas on the surface of the vehicle in which the defect is detected.

Other example implementations provide an apparatus, method and computer-readable storage medium for generating a 3D visually representative model of a vehicle.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIG. 6 illustrates the wireframe mesh and 3D model of FIGS. 4 and 5, including markers indicating areas in which defects are detected, and an image that includes one of the defects, according to some example implementations;

FIGS. 7A, 7B, 7C, 7D and 7E are flowcharts illustrating various steps in a method of generating a 3D visually representative model of a vehicle, according to example implementations.

DETAILED DESCRIPTION

Figure 1:
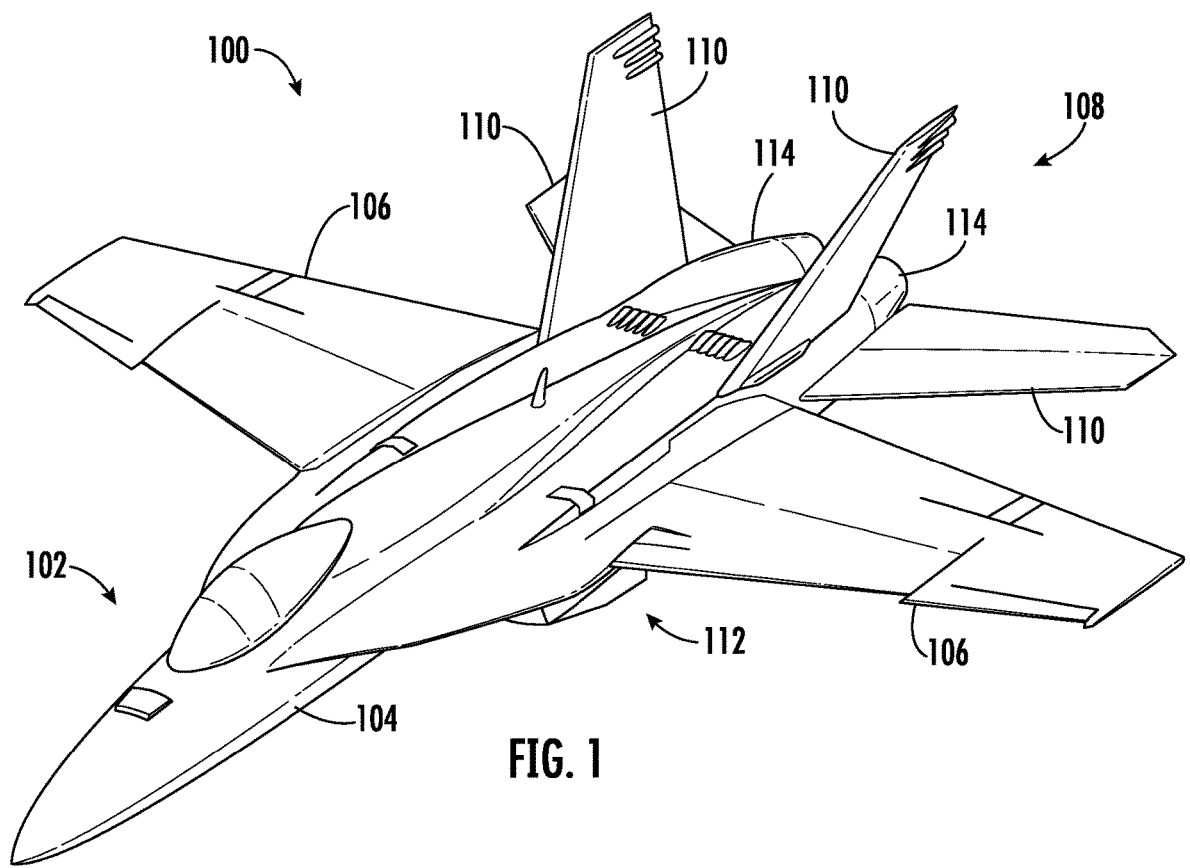
FIG. 1 illustrates one type of vehicle, namely, an aircraft that may benefit from example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to vehicular engineering and, in particular, to one or more of the design, construction, operation or use of vehicles. As used herein, a vehicle is a machine designed as an instrument of conveyance by land, water or air. A vehicle designed and configurable to fly may at times be referred to as an aerial vehicle, an aircraft or the like. Other examples of suitable vehicles include any of a number of different types of ground vehicles (e.g., motor vehicles, railed vehicles), watercraft, amphibious vehicles, spacecraft and the like.

A vehicle generally includes a basic structure, and a propulsion system coupled to the basic structure. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The propulsion system includes one or more engines or motors configured to power one or more propulsors to generate propulsive forces that cause the vehicle to move. A propulsor is any of a number of different means of converting power into a propulsive force. Examples of suitable propulsors include rotors, propellers, wheels and the like. In some examples, the propulsion system includes a drivetrain configured to deliver power from the engines/motors to the propulsors. The engines/motors and drivetrain may in some contexts be referred to as the powertrain of the vehicle.

FIG. 1 illustrates one type of vehicle 100, namely, an aircraft that may benefit from example implementations of the present disclosure. As shown, the aircraft includes a basic structure with an airframe 102 including a fuselage 104. The airframe also includes wings 106 that extend from opposing sides of the fuselage, an empennage or tail assembly 108 at a rear end of the fuselage, and the tail assembly includes stabilizers 110. The aircraft also includes a plurality of high-level systems 112 such as a propulsion system. In the particular example shown in FIG. 1, the propulsion system includes two engines 114 configured to power propulsors to generate propulsive forces that cause the aircraft to move. In other implementations, the propulsion system can include other arrangements, for example, engines carried by other portions of the aircraft including the fuselage and/or the tail. As also shown, the high-level systems may also include an electrical system, hydraulic system and/or environmental system. Any number of other systems may be included.

Figure 2:
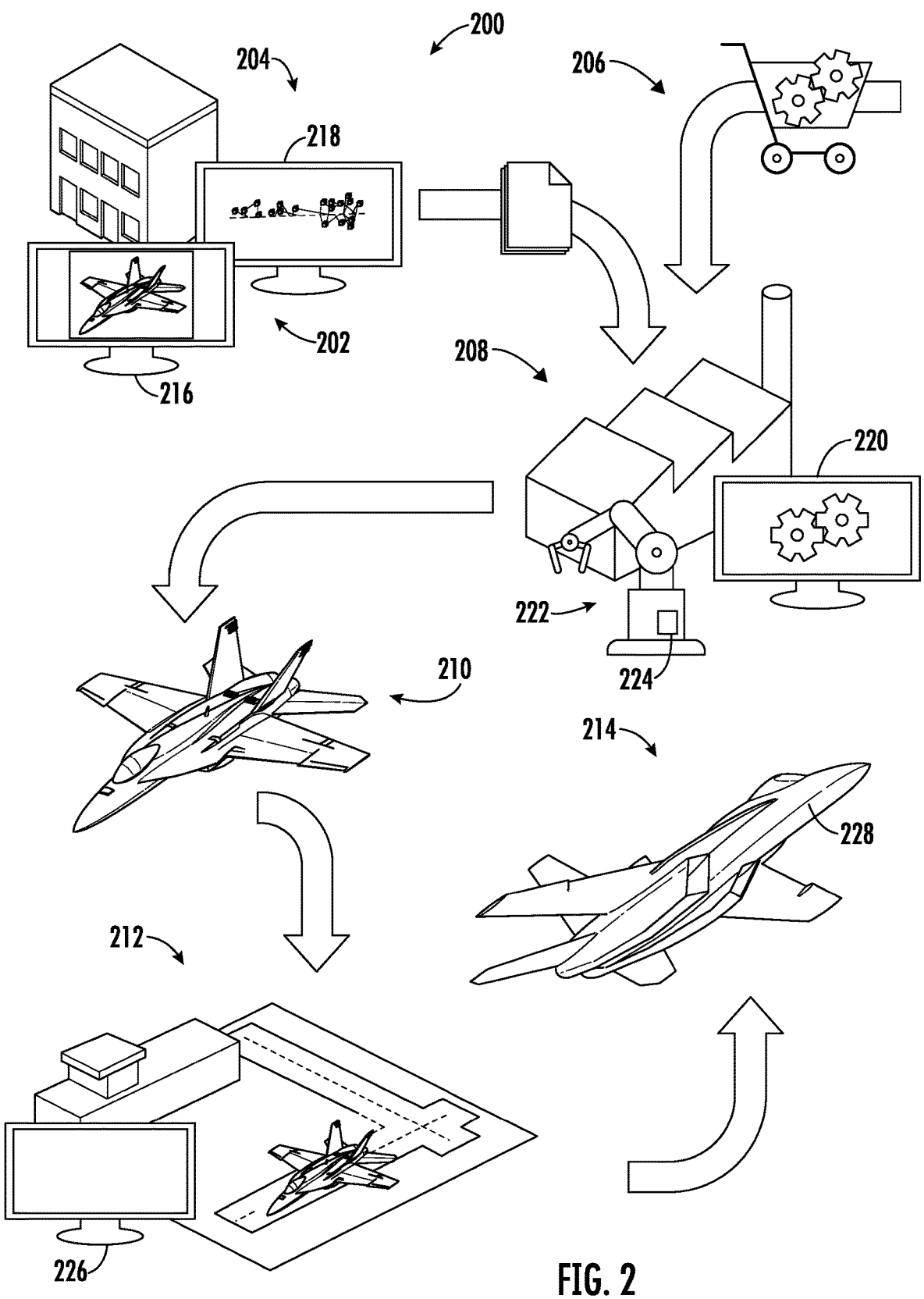
FIG. 2 illustrates an aircraft manufacturing and service method, according to some example implementations.

As explained above, example implementations of the present disclosure relate generally to vehicular engineering and, in particular, to one or more of the design, construction, operation or use of vehicles 100 such as the aircraft shown in FIG. 1. Thus, referring now to FIG. 2, example implementations may be used in the context of an aircraft manufacturing and service method 200. During pre-production, the example method may include specification and design 202 of the aircraft, manufacturing sequence and processing planning 204 and material procurement 206. During production, component and subassembly manufacturing 208 and system integration 210 of the aircraft takes place. Thereafter, the aircraft may go through certification and delivery 212 in order to be placed in service 214. While in service by an operator, the aircraft may be scheduled for maintenance and service (which may also include modification, reconfiguration, refurbishment or the like).

Each of the processes of the example method 200 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

As will also be appreciated, computers are often used throughout the method 200; and in this regard, a "computer" is generally a machine that is programmable or programmed to perform functions or operations. The method as shown makes use of a number of example computers. These computers include computers 216, 218 used for the specification and design 202 of the aircraft, and the manufacturing sequence and processing planning 204. The method may also make use of computers 220 during component and subassembly manufacturing 208, which may also make use of computer numerical control (CNC) machines 222 or other robotics that are controlled by computers 224. Even further, computers 226 may be used while the aircraft is in service 214, as well as during maintenance and service; and as suggested in FIG. 1, the aircraft may itself include one or more computers 228 as part of or separate from its electrical system 116.

A number of the computers 216-228 used in the method 200 may be co-located or directly coupled to one another, or in some examples, various ones of the computers may communicate with one another across one or more computer networks. Further, although shown as part of the method, it should be understood that any one or more of the computers may function or operate separate from the method, without regard to any of the other computers. It should also be understood that the method may include one or more additional or alternative computers than those shown in FIG. 2.

Figure 3:
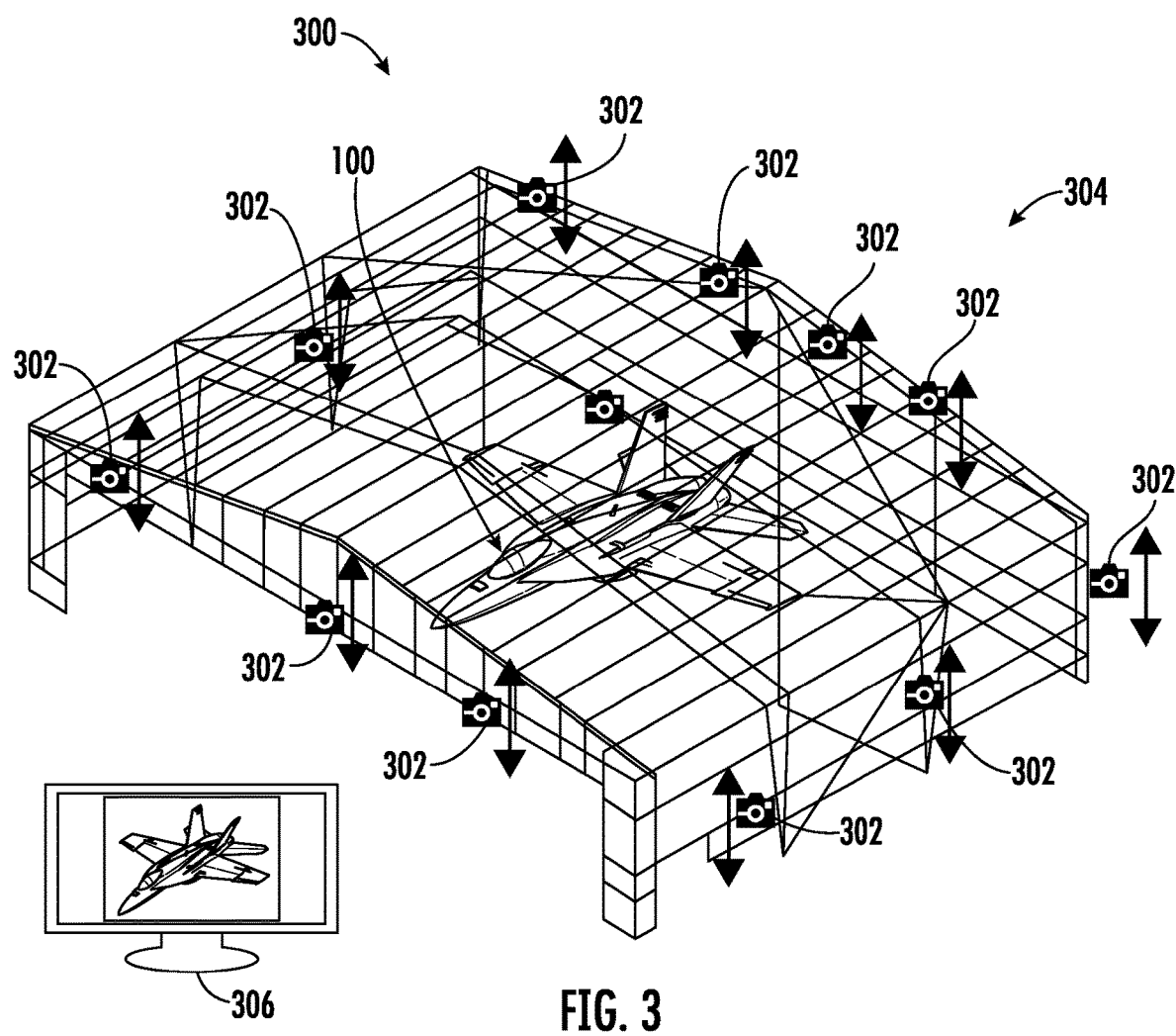
FIG. 3 illustrates an inspection system for generating a three-dimensional (3D) visually representative model of a vehicle, according to some example implementations.

Example implementations of the present disclosure may be implemented throughout the aircraft manufacturing and service method 200, but are particularly well suited for implementation during either or both production or in-service. In this regard, some example implementations provide a system and method of inspection of a vehicle 100 such as an aircraft. FIG. 3 illustrates a system 300 for generating a three-dimensional (3D) visually representative model of a vehicle 100 such as an aircraft, according to some example implementations. The system includes a plurality of imaging devices 302 positioned within a hangar 304. A hangar is often viewed as a building designed to hold an aircraft or spacecraft. As described herein, however, the term hangar more generally refers to a building, garage or the like that is designed to hold a vehicle of any of a number of different types (e.g., aircraft, ground vehicles, watercraft, amphibious vehicles, spacecraft).

In some examples, the plurality of imaging devices 302 include high-resolution, wide-angle cameras. Additionally or alternatively, in some examples, the plurality of imaging devices include a geometric 3D scanner. In this regard, the plurality of imaging devices may include optical equipment (cameras), a geometric 3D scanner (structured light, infrared, or laser) with optical capture capability (color data collection), or a combination of optical equipment and geometric 3D scanner without optical capture capability.

According to example implementations, the plurality of imaging devices 302 are positioned within the hangar 304 such that the imaging devices are configured to acquire images from a number of viewpoints of different sections of the vehicle 100. As shown, this may include the imaging devices at different positions relative to the vehicle so that each imaging device acquires an image from a respective one of the number of viewpoints. In some examples, an imaging device (or multiple ones of the plurality of imaging devices) may be movable such that the imaging device itself is configured to acquire images from more than one of the number of viewpoints.

Figure 4:
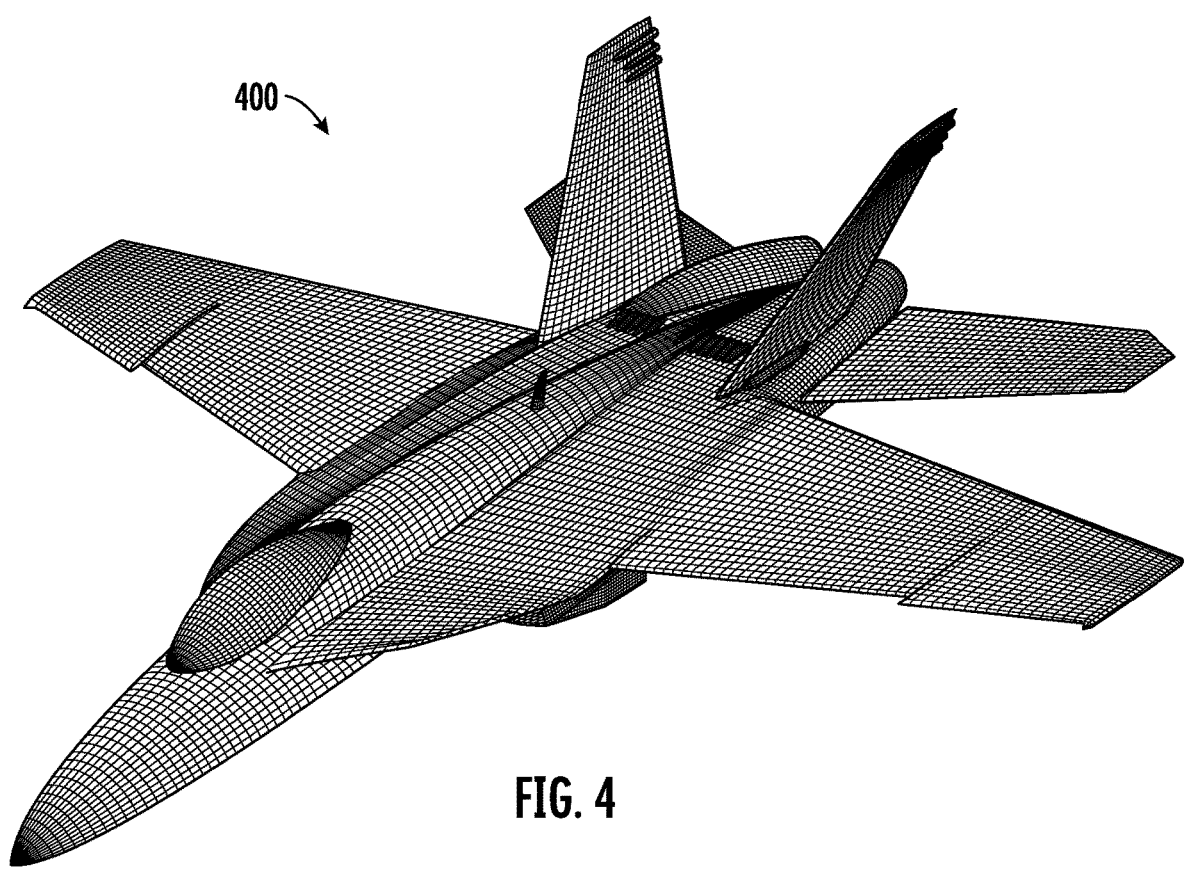
FIGS. 4 and 5 illustrate respectively a wireframe mesh and 3D model of the vehicle shown in FIG. 1, according to some example implementations.
Figure 5:
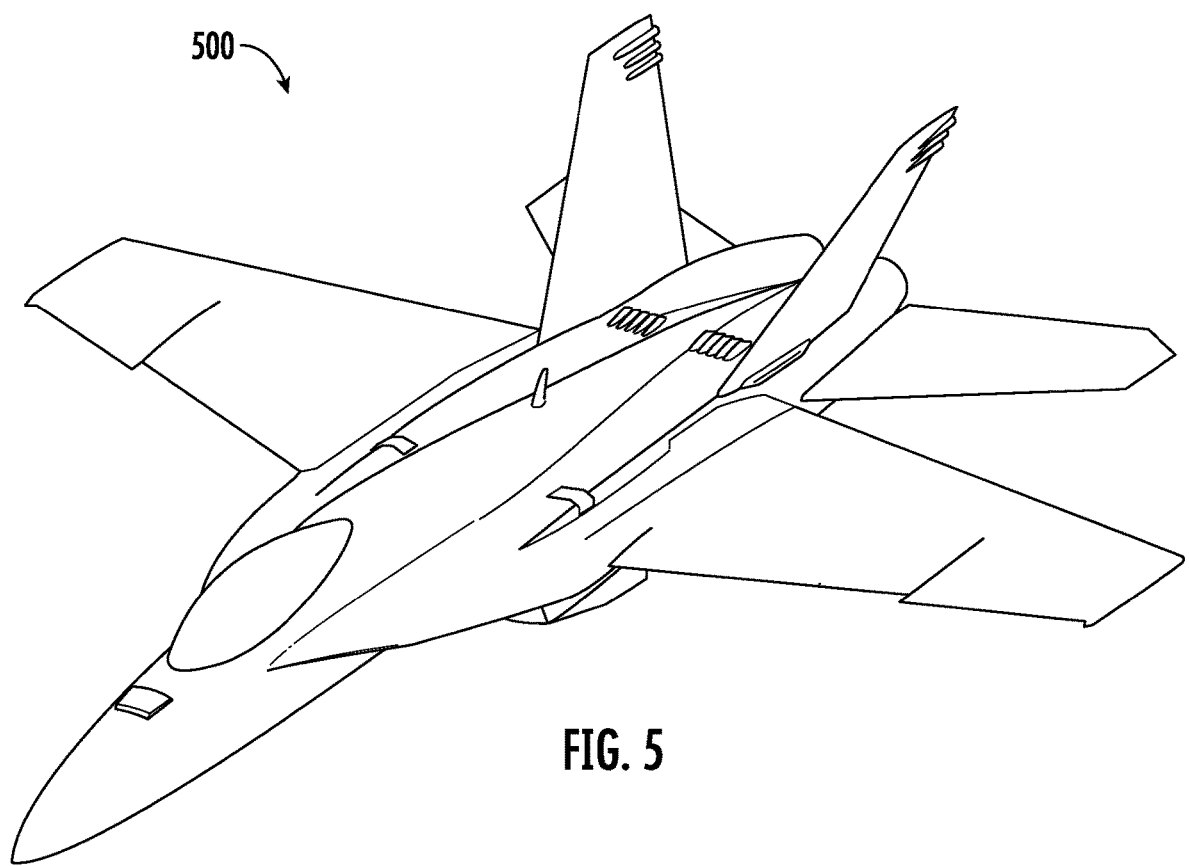

The system 300 also includes a computer 306 that may be co-located or directly coupled to one or more of the plurality of imaging devices 302, or in some examples, the computer may communicate with the plurality of imaging devices across one or more computer networks. The computer is configured to receive the images from the plurality of imaging devices, and perform photogrammetry on the images to extract a profile of the vehicle 100. The computer is configured to create a wireframe mesh or point cloud (or both a wireframe mesh and point cloud) from the profile, and generate a 3D model of the vehicle based on the wireframe mesh or the point cloud (or both the wireframe mesh and the point cloud). FIGS. 4 and 5 illustrate respectively a wireframe mesh 400 and 3D model 500 of the vehicle shown in FIG. 1, according to some example implementations.

In some examples, the photogrammetry is performed by the computer 306 to at least separate the vehicle from a background in the images using a mask. In some of these examples, the computer configured to create the wireframe mesh or the point cloud includes the computer configured to merge the images after the vehicle is separated from the background, and create the wireframe mesh or the point cloud from the images as merged.

Returning to FIG. 3, the computer 306 is configured to create a photo-realistic texture from a two-dimensional (2D) or 3D scan of the vehicle 100. The photo-realistic texture may then be mapped to the wireframe mesh or point cloud, including the photo-realistic texture mapped onto 2D faces of the 3D model as colorized points, voxels, or mapped pixels. The photo-realistic texture may then be displayed on the 3D model.

In some more particular examples, the computer 306 may be configured to generate a 3D photographic model of the vehicle 100 using a 3D mesh of polygon faces, texture (images), and a UV map used to map photo pixels to the polygon faces. In examples in which the plurality of imaging devices 302 include high-resolution, wide-angle cameras, the computer may receive the images acquired by the cameras, perform photogrammetry on the images to produce a wireframe mesh, a texture image and UV map. When the plurality of imaging devices include a geometric 3D scanner with color collection, the computer may receive the images as 3D points of the vehicle and associated color information. The computer may convert the 3D points into a wireframe mesh, and use the color information to create a texture image and UV map. And when the plurality of imaging devices include both the cameras and geometric 3D scanner, the computer may receive 3D points and non-associated images of the vehicle. The 3D points may be converted into a wireframe mesh; and the images may be aligned and projected onto the wireframe mesh to create a texture image and UV map.

In some examples, the computer 306 is further configured to perform registration of the 3D model to a 3D geometry model of the vehicle 100 as an iteration of the 3D geometry model of the vehicle, the iteration of the 3D geometry model including a digital record indicating the one or more areas on the surface of the vehicle in which the defect is detected and any repair of the defect.

The computer 306 is configured to perform image processing of the images to determine one or more areas on a surface of the vehicle 100 in which a defect is detected. In this regard, the image processing may be performed to identify any anomalies on the one or more areas on the surface of the vehicle. The image processing may be performed in a number of different manners. In some examples, the computer is configured to compare the 3D model or the images to respectively a reference 3D model or reference images of the vehicle, to determine the one or more areas in which the defect is detected. In other examples, the image processing may include human interaction (human-in-the-loop) to determine the one or more areas on the surface in which the defect is detected.

The computer 306 is configured to append one or more markers onto respective one or more areas of the 3D model that correspond to the one or more areas on the surface of the vehicle 100 such that the defect is appended onto the 3D model. In some examples, the one or more markers are appended onto respective one or more areas of the 3D model to provide a digital record indicating the one or more areas on the surface of the vehicle in which the defect is detected.

The computer 306 is configured to generate a display of the 3D model of the vehicle 100 including the one or more markers that indicate the one or more areas on the surface of the vehicle in which the defect is detected. In some examples, the display that is generated further includes information for the one or more markers based on user selection of respective ones of the one or more markers. In this regard, the information may describe the one or more areas on the surface of the vehicle and any repair of the defect in the one or more areas, and providing a digital record for defect and any repair of the defect for the vehicle. And in some examples, the information indicates a level of severity of the defect in the one or more areas.

FIG. 6 illustrates the wireframe mesh 400 and 3D model 500 of FIGS. 4 and 5, including markers 602 indicating areas in which defects are detected, according to some example implementations. Also shown in an inset is an image 604 of the images for the defect detected at one of the areas marked by a marker, which may be associated with the marker and thereby the area of the vehicle.

FIGS. 7A-7E are flowcharts illustrating various steps in a method 700 of generating a three-dimensional (3D) visually representative model of a vehicle 100, according to various example implementations of the present disclosure. The method includes receiving images from a plurality of imaging devices positioned within a hangar such that the imaging devices acquire the images from a number of viewpoints of different sections of a vehicle within the hangar, as shown at block 702 of FIG. 7A. The method includes performing photogrammetry on the images to extract a profile of the vehicle, as shown at block 704. The method includes creating a wireframe mesh or point cloud from the profile, and generate a 3D model of the vehicle based on the wireframe mesh or the point cloud, as shown at block 706. The method includes performing image processing of the images to determine one or more areas on a surface of the vehicle in which a defect is detected, as shown at block 708. The method includes appending one or more markers onto respective one or more areas of the 3D model that correspond to the one or more areas on the surface of the vehicle such that the defect is appended onto the 3D model, as shown at block 710. And the method includes generating a display of the 3D model of the vehicle including the one or more markers that indicate the one or more areas on the surface of the vehicle in which the defect is detected, as shown at block 712.

In some examples, the one or more markers are appended onto respective one or more areas of the 3D model at block 710 to provide a digital record indicating the one or more areas on the surface of the vehicle 100 in which the defect is detected.

In some examples, the display that is generated at block 712 further includes information for the one or more markers based on user selection of respective ones of the one or more markers, the information describing the one or more areas on the surface of the vehicle 100 and any repair of the defect in the one or more areas, and providing a digital record for defect and any repair of the defect for the vehicle.

In some further examples, the information indicates a level of severity of the defect in the one or more areas.

In some examples, the image processing is performed at block 708 to identify any anomalies on the one or more areas on the surface of the vehicle 100.

Figure 7A:
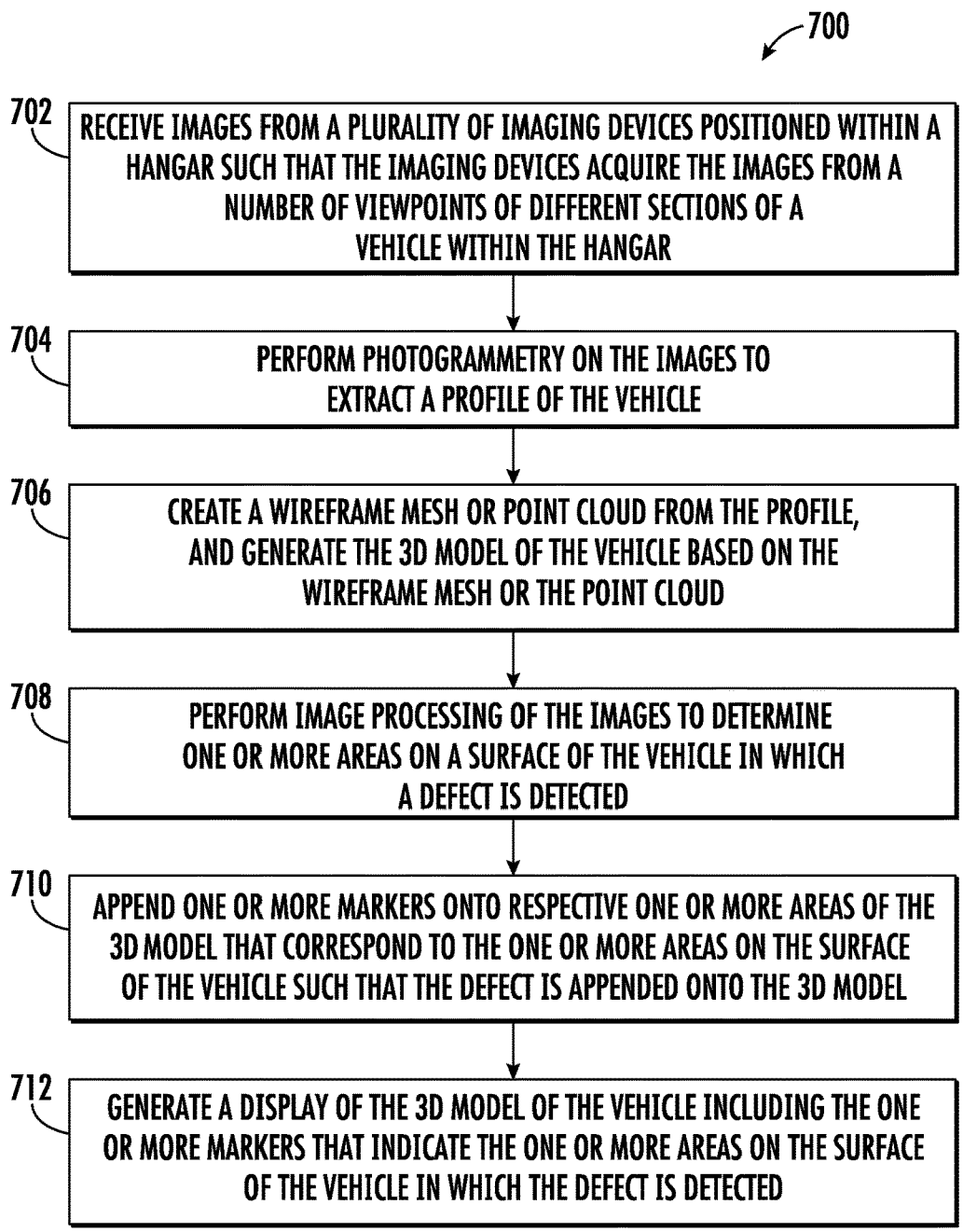
Figure 7B:
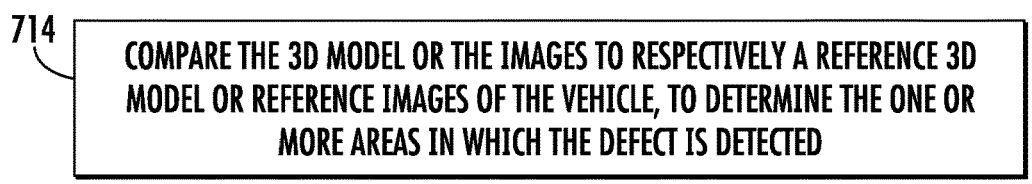

In some examples, performing the image processing at block 708 includes comparing the 3D model or the images to respectively a reference 3D model or reference images of the vehicle 100, to determine the one or more areas in which the defect is detected, as shown at block 714 of FIG. 7B.

In some examples, the method 700 further includes performing registration of the 3D model to a 3D geometry model of the vehicle 100 as an iteration of the 3D geometry model of the vehicle, as shown at block 716 of FIG. 7C. In some of these examples, the iteration of the 3D geometry model includes a digital record indicating the one or more areas on the surface of the vehicle in which the defect is detected and any repair of the defect.

In some examples, the photogrammetry is performed at block 704 to at least separate the vehicle 100 from a background in the images using a mask. In some of these examples, creating the wireframe mesh or the point cloud at block 706 includes merging the images after the vehicle is separated from the background, as shown at block 718 of FIG. 7D. The wireframe mesh or the point cloud are then created from the images as merged, as shown at block 720.

In some examples, the images are received at block 702 from the plurality of imaging devices that include high-resolution, wide-angle cameras.

In some examples, the method 700 further includes creating a photo-realistic texture from a two-dimensional (2D) or 3D scan of the vehicle 100, as shown at block 722 of FIG. 7E. The method includes mapping the photo-realistic texture to the wireframe mesh, including the photo-realistic texture mapped onto 2D faces of the 3D model as colorized points, voxels, or mapped pixels, as shown at block 724. And the method includes displaying the photo-realistic texture on the 3D model, as shown at block 726.

According to example implementations of the present disclosure, the system 300 and its subsystems including the computer 306 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 8:
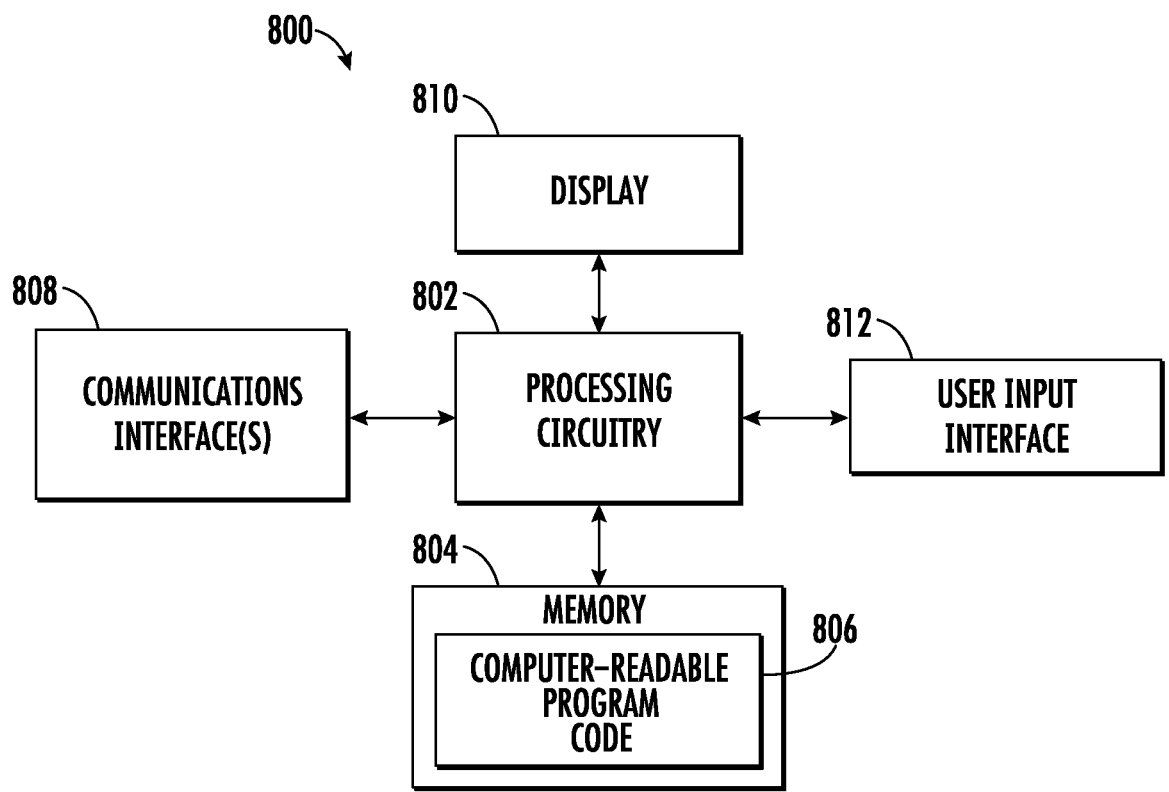
FIG. 8 illustrates an apparatus according to some example implementations.

FIG. 8 illustrates an apparatus 800 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 802 (e.g., processor unit) connected to a memory 804 (e.g., storage device).

The processing circuitry 802 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 804 (of the same or another apparatus).

The processing circuitry 802 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 804 is generally any piece of computer hardware that is capable of storing information such as, for example, data, computer programs (e.g., computer-readable program code 806) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 804, the processing circuitry 802 may also be connected to one or more interfaces for displaying, transmitting and/or receiving information. The interfaces may include a communications interface 808 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 810 and/or one or more user input interfaces 812 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 800 may include a processing circuitry 802 and a computer-readable storage medium or memory 804 coupled to the processing circuitry, where the processing circuitry is configured to execute computer-readable program code 806 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An inspection system for generating a three-dimensional (3D) visually representative model of a vehicle, the system comprising: a plurality of imaging devices positioned within a hangar such that the imaging devices are configured to acquire images from a number of viewpoints of different sections of a vehicle within the hangar; and a computer configured to at least: receive the images from the plurality of imaging devices; perform photogrammetry on the images to extract a profile of the vehicle; create a wireframe mesh or point cloud from the profile, and generate a 3D model of the vehicle based on the wireframe mesh or the point cloud; perform image processing of the images to determine one or more areas on a surface of the vehicle in which a defect is detected; append one or more markers onto respective one or more areas of the 3D model that correspond to the one or more areas on the surface of the vehicle such that the defect is appended onto the 3D model; and generate a display of the 3D model of the vehicle including the one or more markers that indicate the one or more areas on the surface of the vehicle in which the defect is detected.

Clause 2. The inspection system of clause 1, wherein the one or more markers are appended onto respective one or more areas of the 3D model to provide a digital record indicating the one or more areas on the surface of the vehicle in which the defect is detected.

Clause 3. The inspection system of clause 1 or clause 2, wherein the display that is generated further includes information for the one or more markers based on user selection of respective ones of the one or more markers, the information describing the one or more areas on the surface of the vehicle and any repair of the defect in the one or more areas, and providing a digital record for defect and any repair of the defect for the vehicle.

Clause 4. The inspection system of clause 3, wherein the information indicates a level of severity of the defect in the one or more areas.

Clause 5. The inspection system of any of clauses 1 to 4, wherein the image processing is performed to identify any anomalies on the one or more areas on the surface of the vehicle.

Clause 6. The inspection system of any of clauses 1 to 5, wherein the computer configured to perform the image processing includes the computer configured to compare the 3D model or the images to respectively a reference 3D model or reference images of the vehicle, to determine the one or more areas in which the defect is detected.

Clause 7. The inspection system of any of clauses 1 to 6, wherein the computer is further configured to perform registration of the 3D model to a 3D geometry model of the vehicle as an iteration of the 3D geometry model of the vehicle, the iteration of the 3D geometry model including a digital record indicating the one or more areas on the surface of the vehicle in which the defect is detected and any repair of the defect.

Clause 8. The inspection system of any of clauses 1 to 7, wherein the photogrammetry is performed to at least separate the vehicle from a background in the images using a mask, and wherein the computer configured to create the wireframe mesh or the point cloud includes the computer configured to merge the images after the vehicle is separated from the background, and create the wireframe mesh or the point cloud from the images as merged.

Clause 9. The inspection system of any of clauses 1 to 8, wherein the images are received from the plurality of imaging devices that include high-resolution, wide-angle cameras.

Clause 10. The inspection system of any of clauses 1 to 9, wherein the computer is further configured to at least: create a photo-realistic texture from a two-dimensional (2D) or 3D scan of the vehicle; map the photo-realistic texture to the wireframe mesh, including the photo-realistic texture mapped onto 2D faces of the 3D model as colorized points, voxels, or mapped pixels; and display the photo-realistic texture on the 3D model.

Clause 11. An apparatus for generating a three-dimensional (3D) visually representative model of a vehicle, the apparatus comprising: a memory configured to store computer-readable program code; and processing circuitry configured to access the memory, and execute the computer-readable program code to cause the apparatus to at least: receive images from a plurality of imaging devices positioned within a hangar such that the imaging devices acquire the images from a number of viewpoints of different sections of a vehicle within the hangar; perform photogrammetry on the images to extract a profile of the vehicle; create a wireframe mesh or point cloud from the profile, and generate a 3D model of the vehicle based on the wireframe mesh or the point cloud; perform image processing of the images to determine one or more areas on a surface of the vehicle in which a defect is detected; append one or more markers onto respective one or more areas of the 3D model that correspond to the one or more areas on the surface of the vehicle such that the defect is appended onto the 3D model; and generate a display of the 3D model of the vehicle including the one or more markers that indicate the one or more areas on the surface of the vehicle in which the defect is detected.

Clause 12. The apparatus of clause 11, wherein the one or more markers are appended onto respective one or more areas of the 3D model to provide a digital record indicating the one or more areas on the surface of the vehicle in which the defect is detected.

Clause 13. The apparatus of clause 11 or clause 12, wherein the display that is generated further includes information for the one or more markers based on user selection of respective ones of the one or more markers, the information describing the one or more areas on the surface of the vehicle and any repair of the defect in the one or more areas, and providing a digital record for defect and any repair of the defect for the vehicle.

Clause 14. The apparatus of clause 13, wherein the information indicates a level of severity of the defect in the one or more areas.

Clause 15. The apparatus of any of clauses 11 to 14, wherein the image processing is performed to identify any anomalies on the one or more areas on the surface of the vehicle.

Clause 16. The apparatus of any of clauses 11 to 15, wherein the apparatus caused to perform the image processing includes the apparatus caused to compare the 3D model or the images to respectively a reference 3D model or reference images of the vehicle, to determine the one or more areas in which the defect is detected.

Clause 17. The apparatus of any of clauses 11 to 16, wherein the processing circuitry is configured to execute the computer-readable program code to cause the apparatus to further perform registration of the 3D model to a 3D geometry model of the vehicle as an iteration of the 3D geometry model of the vehicle, the iteration of the 3D geometry model including a digital record indicating the one or more areas on the surface of the vehicle in which the defect is detected and any repair of the defect.

Clause 18. The apparatus of any of clauses 11 to 17, wherein the photogrammetry is performed to at least separate the vehicle from a background in the images using a mask, and wherein the apparatus caused to create the wireframe mesh or the point cloud includes the apparatus caused to merge the images after the vehicle is separated from the background, and create the wireframe mesh or the point cloud from the images as merged.

Clause 19. The apparatus of any of clauses 11 to 18, wherein the images are received from the plurality of imaging devices that include high-resolution, wide-angle cameras.

Clause 20. The apparatus of any of clauses 11 to 19, wherein the processing circuitry is configured to execute the computer-readable program code to cause the apparatus to further at least: create a photo-realistic texture from a two-dimensional (2D) or 3D scan of the vehicle; map the photo-realistic texture to the wireframe mesh, including the photo-realistic texture mapped onto 2D faces of the 3D model as colorized points, voxels, or mapped pixels; and display the photo-realistic texture on the 3D model.

Clause 21. A method of generating a three-dimensional (3D) visually representative model of a vehicle, the method comprising: receiving images from a plurality of imaging devices positioned within a hangar such that the imaging devices acquire the images from a number of viewpoints of different sections of a vehicle within the hangar; performing photogrammetry on the images to extract a profile of the vehicle; creating a wireframe mesh or point cloud from the profile, and generate a 3D model of the vehicle based on the wireframe mesh or the point cloud; performing image processing of the images to determine one or more areas on a surface of the vehicle in which a defect is detected; appending one or more markers onto respective one or more areas of the 3D model that correspond to the one or more areas on the surface of the vehicle such that the defect is appended onto the 3D model; and generating a display of the 3D model of the vehicle including the one or more markers that indicate the one or more areas on the surface of the vehicle in which the defect is detected.

Clause 22. The method of clause 21, wherein the one or more markers are appended onto respective one or more areas of the 3D model to provide a digital record indicating the one or more areas on the surface of the vehicle in which the defect is detected.

Clause 23. The method of clause 21 or clause 22, wherein the display that is generated further includes information for the one or more markers based on user selection of respective ones of the one or more markers, the information describing the one or more areas on the surface of the vehicle and any repair of the defect in the one or more areas, and providing a digital record for defect and any repair of the defect for the vehicle.

Clause 24. The method of clause 23, wherein the information indicates a level of severity of the defect in the one or more areas.

Clause 25. The method of any of clauses 21 to 24, wherein the image processing is performed to identify any anomalies on the one or more areas on the surface of the vehicle.

Clause 26. The method of any of clauses 21 to 25, wherein performing the image processing includes comparing the 3D model or the images to respectively a reference 3D model or reference images of the vehicle, to determine the one or more areas in which the defect is detected.

Clause 27. The method of any of clauses 21 to 26, wherein the method further comprises performing registration of the 3D model to a 3D geometry model of the vehicle as an iteration of the 3D geometry model of the vehicle, the iteration of the 3D geometry model including a digital record indicating the one or more areas on the surface of the vehicle in which the defect is detected and any repair of the defect.

Clause 28. The method of any of clauses 21 to 27, wherein the photogrammetry is performed to at least separate the vehicle from a background in the images using a mask, and wherein creating the wireframe mesh or the point cloud includes merging the images after the vehicle is separated from the background, and creating the wireframe mesh or the point cloud from the images as merged.

Clause 29. The method of any of clauses 21 to 28, wherein the images are received from the plurality of imaging devices that include high-resolution, wide-angle cameras.

Clause 30. The method of any of clauses 21 to 29, wherein the method further comprises: creating a photo-realistic texture from a two-dimensional (2D) or 3D scan of the vehicle; mapping the photo-realistic texture to the wireframe mesh, including the photo-realistic texture mapped onto 2D faces of the 3D model as colorized points, voxels, or mapped pixels; and displaying the photo-realistic texture on the 3D model.

Clause 31. A computer-readable storage medium for generating a three-dimensional (3D) visually representative model of a vehicle, the computer-readable storage medium being non-transitory and having computer-readable program code stored therein that, in response to execution by processing circuitry, causes an apparatus to at least: receive images from a plurality of imaging devices positioned within a hangar such that the imaging devices acquire the images from a number of viewpoints of different sections of a vehicle within the hangar; perform photogrammetry on the images to extract a profile of the vehicle; create a wireframe mesh or point cloud from the profile, and generate a 3D model of the vehicle based on the wireframe mesh or the point cloud; perform image processing of the images to determine one or more areas on a surface of the vehicle in which a defect is detected; append one or more markers onto respective one or more areas of the 3D model that correspond to the one or more areas on the surface of the vehicle such that the defect is appended onto the 3D model; and generate a display of the 3D model of the vehicle including the one or more markers that indicate the one or more areas on the surface of the vehicle in which the defect is detected.

Clause 32. The computer-readable storage medium of clause 31, wherein the one or more markers are appended onto respective one or more areas of the 3D model to provide a digital record indicating the one or more areas on the surface of the vehicle in which the defect is detected.

Clause 33. The computer-readable storage medium of clause 31 or clause 32, wherein the display that is generated further includes information for the one or more markers based on user selection of respective ones of the one or more markers, the information describing the one or more areas on the surface of the vehicle and any repair of the defect in the one or more areas, and providing a digital record for defect and any repair of the defect for the vehicle.

Clause 34. The computer-readable storage medium of clause 33, wherein the information indicates a level of severity of the defect in the one or more areas.

Clause 35. The computer-readable storage medium of any of clauses 31 to 34, wherein the image processing is performed to identify any anomalies on the one or more areas on the surface of the vehicle.

Clause 36. The computer-readable storage medium of any of clauses 31 to 35, wherein the apparatus caused to perform the image processing includes the apparatus caused to compare the 3D model or the images to respectively a reference 3D model or reference images of the vehicle, to determine the one or more areas in which the defect is detected.

Clause 37. The computer-readable storage medium of any of clauses 31 to 36, wherein the computer-readable storage medium has further computer-readable program code stored therein that, in response to execution by the processing circuitry, causes the apparatus to further perform registration of the 3D model to a 3D geometry model of the vehicle as an iteration of the 3D geometry model of the vehicle, the iteration of the 3D geometry model including a digital record indicating the one or more areas on the surface of the vehicle in which the defect is detected and any repair of the defect.

Clause 38. The computer-readable storage medium of any of clauses 31 to 37, wherein the photogrammetry is performed to at least separate the vehicle from a background in the images using a mask, and wherein the apparatus caused to create the wireframe mesh or the point cloud includes the apparatus caused to merge the images after the vehicle is separated from the background, and create the wireframe mesh or the point cloud from the images as merged.

Clause 39. The computer-readable storage medium of any of clauses 31 to 38, wherein the images are received from the plurality of imaging devices that include high-resolution, wide-angle cameras.

Clause 40. The computer-readable storage medium of any of clauses 31 to 39, wherein the computer-readable storage medium has further computer-readable program code stored therein that, in response to execution by the processing circuitry, causes the apparatus to further at least: create a photo-realistic texture from a two-dimensional (2D) or 3D scan of the vehicle; map the photo-realistic texture to the wireframe mesh, including the photo-realistic texture mapped onto 2D faces of the 3D model as colorized points, voxels, or mapped pixels; and display the photo-realistic texture on the 3D model.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An inspection system for generating a three-dimensional (3D) visually representative model of a vehicle, the inspection system comprising:
  a plurality of imaging devices positioned within a hangar at a plurality of distinct locations and configured to acquire images from a number of viewpoints of different sections of the vehicle within the hangar; and
  a computer configured to:
    receive the images from the plurality of imaging devices;
    perform photogrammetry on the images to extract a profile of the vehicle;
    create a wireframe mesh from the profile;
    generate a 3D model of the vehicle based on the wireframe mesh, the wireframe mesh including a 3D mesh of polygon faces, a texture image, and a UV map that maps photo pixels to the polygon faces, wherein generating the 3D model includes receiving the images as 3D points of the vehicle and associated color information, converting the 3D points into the wireframe mesh, and using the color information to create the texture image and the UV map;
    perform image processing of the images to determine if one or more areas on a surface of the vehicle have a defect;
    append one or more markers onto respective one or more areas of the 3D model that correspond to the one or more areas on the surface of the vehicle having the defect such that the defect is appended onto the 3D model, each of the one or more markers including a respective user-selectable digital record containing a defect type of the defect, a severity level of the defect, and a stepped resolution of the defect enabling zooming to enhance details of the defect; and
    generate a display of the 3D model of the vehicle including the one or more markers that indicate the one or more areas on the surface of the vehicle having the defect.

2. The inspection system of claim 1, further comprising:
  a memory device storing the one or more markers appended onto the respective one or more areas of the 3D model; and
  a display device displaying the 3D model with the one or more markers and the user-selectable digital records indicating the one or more areas on the surface of the vehicle having the defect.

3. The inspection system of claim 1, wherein the user-selectable digital records further contain location information indicating a location of the defect on the vehicle.

4. The inspection system of claim 1, wherein the image processing is performed to identify any anomalies on the one or more areas on the surface of the vehicle.

5. The inspection system of claim 1, wherein performing the image processing includes comparing the 3D model or the images to respectively a reference 3D model or reference images of the vehicle to determine the one or more areas in which the defect is detected.

6. The inspection system of claim 1, wherein the computer is further configured to perform registration of the 3D model to a 3D geometry model of the vehicle as an iteration of the 3D geometry model of the vehicle, the iteration of the 3D geometry model including a respective one of the digital records indicating the one or more areas on the surface of the vehicle in which the defect is detected and any repair of the defect.

7. The inspection system of claim 1, wherein the photogrammetry is performed to at least separate the vehicle from a background in the images using a mask, and wherein creating the wireframe mesh includes merging the images after the vehicle is separated from the background, and creating the wireframe mesh from the images as merged.

8. The inspection system of claim 1, wherein the computer is further configured to:
create a photo-realistic texture from a two-dimensional (2D) or 3D scan of the vehicle;
map the photo-realistic texture to the wireframe mesh, including the photo realistic texture mapped onto 2D faces of the 3D model as colorized points, voxels, or mapped pixels; and
display the photo-realistic texture on the 3D model.

9. An inspection system for generating a three-dimensional (3D) visually representative model of a vehicle, the inspection system comprising:
a plurality of imaging devices positioned within a hangar at a plurality of distinct locations and configured to acquire images from a number of viewpoints of different sections of the vehicle within the hangar; and
a computer configured to:
receive the images from the plurality of imaging devices;
perform photogrammetry on the images to extract a profile of the vehicle;
create a wireframe mesh from the profile;
generate a 3D model of the vehicle based on the wireframe mesh, the wireframe mesh including a 3D mesh of polygon faces, a texture image, and a UV map that maps photo pixels to the polygon faces, wherein generating the 3D model includes receiving the images as 3D points of the vehicle and associated color information, converting the 3D points into the wireframe mesh, and using the color information to create the texture image and the UV map;
perform image processing of the images to determine if one or more areas on a surface of the vehicle have a defect;
append one or more markers onto respective one or more areas of the 3D model that correspond to the one or more areas on the surface of the vehicle having the defect such that the defect is appended onto the 3D model, each of the one or more markers including a respective user-selectable digital record containing a defect type, a severity level of the defect, and a stepped resolution of the defect enabling zooming to enhance details of the defect, wherein the user-selectable digital records further contain information describing the one or more areas on the surface of the vehicle having the defect and any repair of the defect in the one or more areas; and
generate a display of the 3D model of the vehicle including the one or more markers that indicate the one or more areas on the surface of the vehicle having the defect.

10. The inspection system of claim 9, wherein the plurality of imaging devices includes high-resolution, wide-angle cameras, and wherein the one or more markers including the user-selectable digital records each includes directional lighting to provide users with grazing contrast to detect defects with shadows.

11. A method of generating a three-dimensional (3D) visually representative model of a vehicle, the method comprising:
receiving images from a plurality of imaging devices positioned within a hangar at a plurality of distinct locations, the imaging devices being configured to acquire the images from a number of viewpoints of different sections of the vehicle within the hangar;
performing photogrammetry on the images to extract a profile of the vehicle;
creating a wireframe mesh from the profile;
generating a 3D model of the vehicle based on the wireframe mesh, the wireframe mesh including a 3D mesh of polygon faces, a texture image, and a UV map that maps photo pixels to the polygon faces, wherein generating the 3D model includes receiving the images as 3D points of the vehicle and associated color information, converting the 3D points into the wireframe mesh, and using the color information to create the texture image and the UV map;
performing image processing of the images to determine if one or more areas on a surface of the vehicle have a defect;
appending one or more markers onto respective one or more areas of the 3D model that correspond to the one or more areas on the surface of the vehicle having the defect such that the defect is appended onto the 3D model, each of the one or more markers including a respective user-selectable digital record containing a defect type of the defect, a severity level of the defect, and a stepped resolution of the defect enabling zooming to enhance details of the defect; and
generating a display of the 3D model of the vehicle including the one or more markers that indicate the one or more areas on the surface of the vehicle having the defect.

12. The method of claim 11, further comprising:
storing, via a memory device, the one or more markers appended onto the respective one or more areas of the 3D model; and
displaying, via a display device, the 3D model with the one or more markers and the user-selectable digital records indicating the one or more areas on the surface of the vehicle in which the defect is detected.

13. The method of claim 11, wherein the user-selectable digital records further contain information describing the one or more areas on the surface of the vehicle having the defect and any repair of the defect in the one or more areas.

14. The method of claim 11, wherein the user-selectable digital records further contain location information indicating a location of the defect on the vehicle.

15. The method of claim 11, wherein the image processing is performed to identify any anomalies on the one or more areas on the surface of the vehicle.

16. The method of claim 11, wherein performing the image processing includes comparing the 3D model or the images to respectively a reference 3D model or reference images of the vehicle, to determine the one or more areas in which the defect is detected.

17. The method of claim 11, wherein the method further comprises performing registration of the 3D model to a 3D geometry model of the vehicle as an iteration of the 3D geometry model of the vehicle, the iteration of the 3D geometry model including a respective one of the digital records indicating the one or more areas on the surface of the vehicle in which the defect is detected and any repair of the defect.

18. The method of claim 11, wherein the photogrammetry is performed to at least separate the vehicle from a background in the images using a mask, and wherein creating the wireframe mesh includes merging the images after the vehicle is separated from the background, and creating the wireframe mesh from the images as merged.

19. The method of claim 11, wherein the plurality of imaging devices includes high-resolution, wide-angle cameras and a geometric 3D scanner.

20. The method of claim 11, wherein the method further comprises:
- creating a photo-realistic texture from a two-dimensional (2D) or 3D scan of the vehicle;
- mapping the photo-realistic texture to the wireframe mesh, including the photo realistic texture mapped onto 2D faces of the 3D model as colorized points, voxels, or mapped pixels; and
- displaying the photo-realistic texture on the 3D model.

\* \* \* \* \*